US006442453B1

(12) United States Patent
Fukuoka

(10) Patent No.: US 6,442,453 B1
(45) Date of Patent: Aug. 27, 2002

(54) VEHICLE-TRAVELING SUPPORTING SYSTEM

(75) Inventor: Shouhei Fukuoka, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/653,918

(22) Filed: Sep. 1, 2000

(30) Foreign Application Priority Data

Oct. 8, 1999 (JP) ........................................ 11-288464

(51) Int. Cl.[7] ................................................ G05D 1/00

(52) U.S. Cl. ......................... 701/1; 701/208; 701/209; 342/357.13

(58) Field of Search ......................... 701/1, 200, 207, 701/208, 209, 210; 342/357.13, 357.14, 357.09

(56) References Cited

U.S. PATENT DOCUMENTS 5,113,185 A * 5/1992 Ichikawa .................... 340/995
5,416,477 A * 5/1995 Shibata ...................... 340/988
5,459,667 A * 10/1995 Odagaki et al. ........... 701/209
5,546,311 A * 8/1996 Sekine ....................... 701/208
6,268,825 B1 * 7/2001 Okada .................. 342/357.13

FOREIGN PATENT DOCUMENTS

JP 11-3499 1/1999

* cited by examiner

*Primary Examiner*—Jacques H. Louis-Jacques
(74) *Attorney, Agent, or Firm*—Kenyon & Kenyon

(57) ABSTRACT

While an information communication is carried out in a high efficiency between an on-vehicle apparatus and a road-sided apparatus, a vehicle-traveling supporting system capable of supporting a traveling operation of a vehicle is provided. Traveling difference information between first traveling condition prediction information of the vehicle predicted based upon map information and vehicle traveling model information, and traveling actual-results information judged based upon sensor information of the vehicle is obtained. Second traveling condition prediction information of the vehicle predicted based upon the same map information and the same vehicle travel model information is obtained. The traveling condition of the vehicle in the next traveling operation is predicted based upon corrected traveling condition prediction information which is obtained by correcting the second traveling condition prediction information with the traveling difference information.

5 Claims, 5 Drawing Sheets

VEHICLE-TRAVELING SUPPORTING SYSTEM

BACKGROUND OF THE INVENTION

The present invention is related to a vehicle-traveling supporting system capable of supporting traveling of a vehicle, while information is mutually exchanged between a vehicle-sided traveling supporting apparatus mounted on the vehicle and a road-sided traveling supporting apparatus provided on the side of a road.

In general, the technique capable of supporting the traveling of the vehicle is well known in the field, while information is mutually exchanged or communicated between the vehicle-sided traveling supporting apparatus mounted on the vehicle and the road-sided traveling supporting apparatus provided on the side of the road. The supporting technique is described in, for example, JP-A-11-3499. It should be noted that the vehicle-sided traveling supporting apparatus may also be referred to as an "on-vehicle apparatus", whereas the road-sided traveling supporting apparatus may also be referred to as a "road-sided apparatus."

Conventionally, in order to effectively support the traveling of the vehicle and to perform the automatic driving operation of the vehicle in a high efficiency, the position of the vehicle is required to be detected in high precision and furthermore in real time (namely, minimum delay time). To this end, in the conventional vehicle-traveling supporting system described in JP-A-11-3499, the positional detection is carried out by combining the relative positional relationship between the own vehicle and other vehicles or the positional relationship between the own vehicle and the fixed object which is detected by the own vehicle, and the vehicle position detected by the road-sided apparatus.

Also, with respect to the automatic driving operation of the vehicle, in particular, in view of improvements in safety drive aspects, the manipulation (operation) amounts (namely, open degree of accelerator, steering angle, braking amount and so forth) of the vehicle driver, the instruction values by the vehicle control functions, and the detection values of the vehicle behaviors by the sensors are employed. As a result, the various detecting means capable of detecting the above-explained information are provided with the on-vehicle apparatus.

As explained above, in order that the automatic driving operation of the vehicle and the vehicle-traveling supporting operation are performed by accepting the support made by the road-sided apparatus, the following information may constitute the very important factors. That is, the precise information related to the position of the own vehicle and also to the behavior of the own vehicle is acquired, the obstacles and the road surface conditions are precisely detected in order to judge dangerous situations, and the information is communicated between the on-vehicle apparatus and the road-sided apparatus.

As a concrete example of the vehicle-traveling support by the road-sided apparatus, the road-sided apparatus may warn the dangerous situations to the vehicle, for example, a vehicle having dangerous speeds and behaviors enter into and also the obstacles existed in the curved road portion and the crossing road where the driver of the vehicle cannot see far ahead, or the vehicle sensor cannot observe them.

When the above-described warning operation is performed, both the positions and the behaviors of the own vehicle must be detected in such a precision level minuter than, or equal to the precision level at which the dangerous situation can be judged. Also, the obstacle having such a size larger than, or equal to the size by which the vehicle driving operation is disturbed, and positioned ahead must be detected. Further, the information related to this obstacle is required to be notified as the warning information or the instruction to the vehicle driver.

In the conventional vehicle-traveling supporting system, the vehicle conditions such as the vehicle position, the manipulation amount, and the vehicle behavior must be acquired in higher precision. When the vehicle condition detected by the on-vehicle apparatus is compared with the vehicle condition detected by the road-sided apparatus, the vehicle condition can be detected by the on-vehicle condition in a higher efficiency and higher precision up to now unless both the detected vehicle conditions are combined with each other so as to be corrected.

For example, the continuous communication technique such as the LCX (leakage type wireless technique) owns the following problems. That is, since the facilities are networked over the entire portion of the infrastructure, the huge amounts of facilities are necessarily required. Also, vehicles driven on the intermediate lane within the three or more lanes can be hardly detected. In other words, the high facility investment cost is required and the functional satisfaction cannot be achieved. Also, the GPS navigation system is required to be necessarily combined with other detecting means for detecting the present position of the vehicle at such a difficult positional detecting place as a tunnel, and also means for interpolating time data.

As to the detecting means provided with the on-vehicle apparatus, the detection information may be relatively easily acquired in high precision, for instance, a white lane line is recognized and also a road constructive object is detected by an infrared laser. Namely, these detecting means are practically available up to now.

Also, such information which cannot be detected by the road-sided apparatus may be involved in information which is detected by the on-vehicle apparatus. Concretely speaking, as to this information, there are an instruction value instructed to an actuator of an apparatus provided on a vehicle, and a very small manipulation amount which cannot appear as the vehicle behavior. With respect to the instruction value for instructing the actuator, the behavior of the vehicle may appear as a result obtained by combining this manipulation amount with the instruction given to the actuator. Accordingly, the road-sided apparatus cannot acquire both the manipulation amount and the instruction value given to the actuator only from this behavior.

Furthermore, it is so conceivable that a very small behavior amount which cannot appear in a behavior is located within a very fine error range as control functions with respect to the automatic control of the vehicle and the traveling support of the vehicle. However, such a very small manipulation amount may constitute important information used to predict the intention of the vehicle driver and the situation of the vehicle driver.

For instance, considering now that the vehicle driver sets his foot on the braking pedal of the vehicle due to a certain factor, and manipulates this braking pedal with such a very small manipulation amount which cannot be detected as the actual braking operation, this fact may be understood as follows. That is, the vehicle driver may feel a dangerous situation and thus may prepare a danger avoiding action, for example, the deceleration of the vehicle speed and/or stopping of the vehicle. Also, such an action that the vehicle driver leaves his foot from the accelerator pedal to set the open degree to a zero value may not always immediately appear as the vehicle behavior. Similarly, it is predictable that the vehicle driver may feel dangerous situations and may perform such a preparation operation required for right-turn/left-turn operations in the next drive stage.

On the other hand, as information detectable from the road-sided apparatus, for instance, there are the macro information about a certain wide range which generally has temporal margin, such as information related to macro traffic streams and a traffic jam (traffic congestion) condition and presence/absence of an obstacle located ahead along a traveling road which cannot be detected by the on-vehicle apparatus; and information which is produced/managed by a system provided on the road side of infrastructure such as regulation information, and so forth.

In order to perform the vehicle-traveling supporting operation between the road-sided apparatus and the on-vehicle apparatus, it is effective to execute a process operation for combining information as to nature owned by only one party with each other.

As previously explained, as to the vehicle condition information related to the position and behavior of the vehicle, such information detected by the on-vehicle apparatus may have the highest precision and also the superior information amount. Also, since the detection by the sensors mounted on the vehicle cannot perform at the obstructed view place or at the hidden place by another vehicle, the ahead obstacles or the dropped objects which are required to judge as to whether or not they are dangerous must be detected by the road-sided apparatus.

With respect to the vehicle condition information such as the positions and behaviors of other vehicles, when the vehicle condition information detected by the own vehicle is used, this vehicle condition information is required to be communicated between the own vehicle and other vehicles located around the own vehicle. Also, this mutual communication case, it is practically difficult to communicate such vehicle condition information among these vehicles located at such a place where the vehicle driver cannot see ahead along the traveling road, or a place shadowed by another vehicle.

As a consequence, when a warning system for warning a dangerous situation occurred ahead at the obstructed view place or at the crossroad is constructed, the following system operation may become effective. That is, as to the positions and behaviors of the other vehicles, the vehicle condition information detected by the on-vehicle apparatus is transferred to the road-sided apparatus. In the road-sided apparatus, the process operation which judges the ahead dangerous situation to the own vehicle is carried out by combining the information about the obstacles or the like with the vehicle condition information related to the positions and behaviors of the respective vehicles which is transmitted by the communication channel. When the road-sided apparatus judges that the dangerous situation occurs, this road-sided apparatus may warn this dangerous situation to either the vehicle or the vehicle driver.

As previously described, in order to support the traveling of the vehicle while the information is communicated between the vehicle-sided traveling supporting apparatus (on-vehicle apparatus) and the road-sided traveling supporting apparatus (road-sided apparatus), a total amount of communication information transmitted between the both apparatuses would be required to be reduced so as to increase the supporting efficiency.

SUMMARY OF THE INVENTION

The present invention has been made to solve the above-described problems, and therefore, has an object to provide a vehicle-traveling supporting system capable of supporting the traveling operation of the vehicle, while information is effectively communicated between the on-vehicle apparatus and the road-sided apparatus.

The feature of the present invention is the following. Traveling difference information between first traveling condition prediction information of a vehicle, which is predicted based upon map information and vehicle traveling model information, and traveling actual-results information judged based upon sensor information of the vehicle is obtained. Second traveling condition prediction information of the vehicle predicted based upon the same map information and the same vehicle traveling model information is obtained. A vehicle traveling condition for the next travel operation is predicted based upon corrected traveling condition prediction information that is obtained by correcting this second traveling condition prediction information with the traveling difference information.

In the present invention, the traveling difference information is transmitted from the on-vehicle apparatus to the road-sided apparatus by communication only when there is the traveling difference information between the traveling actual-results information and the traveling condition prediction information of the vehicle. As a consequence, the information communication can be carried out only when the traveling difference information is present, and furthermore, only the traveling difference information may be communicated between the on-vehicle apparatus and the road-sided apparatus, so that a total amount of communication information can be reduced. As a result, the information communication between the on-vehicle apparatus and the road-side apparatus can be carried out in a higher efficiency.

BRIEF DESCRIPTION OF THE DRAWINGS

For a better understanding of the present invention, reference is made of a detailed description to be read in conjunction with the accompanying drawings, in which.

DETAILED DESCRIPTION OF THE EMBODIMENTS

Figure 2:
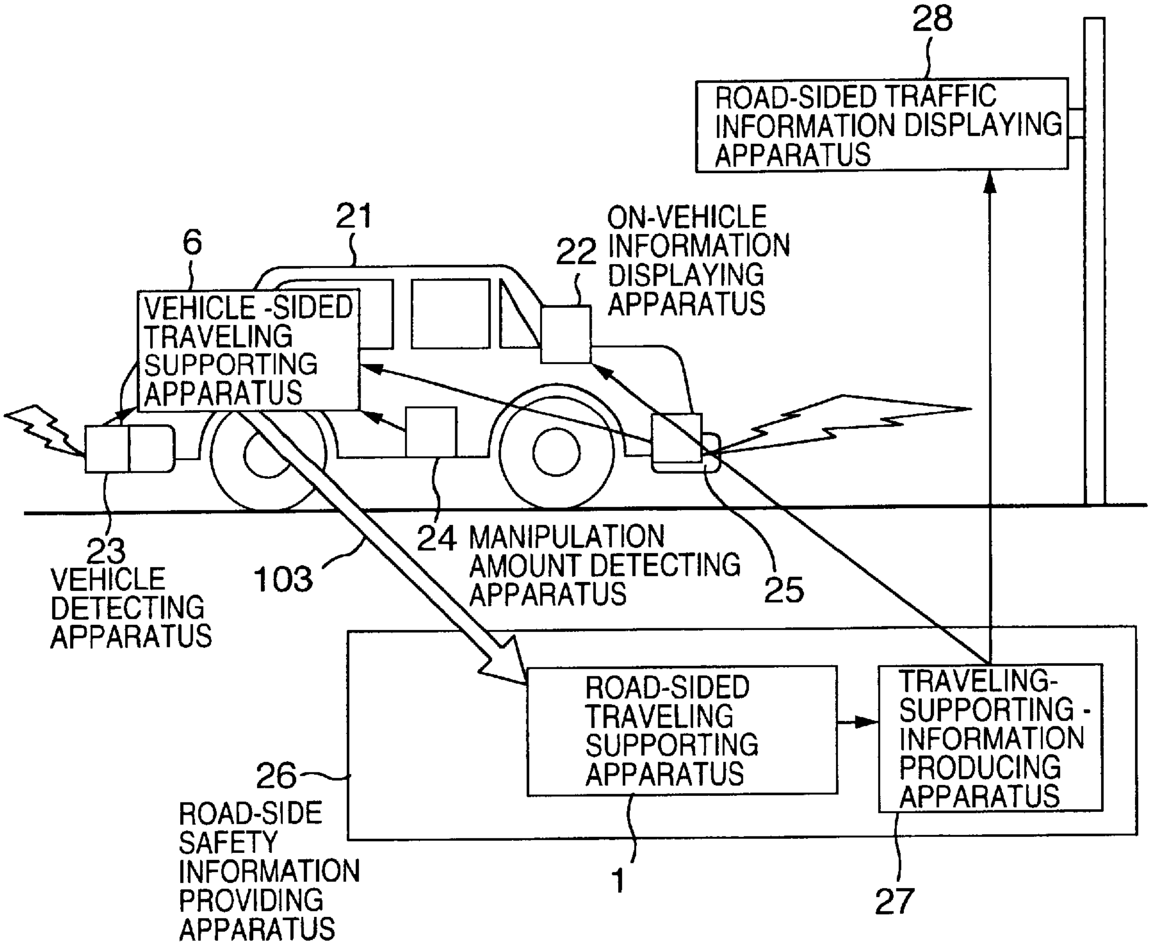
FIG. 2 illustratively shows an entire structure of the vehicle-traveling supporting system according to the embodiment of the present invention.

FIG. 2 illustratively indicates an entire structure of a vehicle-traveling supporting system according to an embodiment of the present invention.

In FIG. 2, a vehicle detecting apparatus 23 for detecting vehicles located along the backward direction other than an own vehicle 21, and a vehicle detecting apparatus 25 for detecting other vehicles and obstacles located along the forward direction are provided with the vehicle 21. The manipulation amount of an actuator of the vehicle 21 is detected by a manipulation amount detecting apparatus 24.

The vehicle condition information such as positional information of the vehicle 21, behavior information thereof and the manipulation amount of the actuator which are detected by the vehicle detecting apparatus 23, the vehicle detecting apparatus 25 and the manipulation amount detecting apparatus 24 is supplied to a vehicle-sided traveling supporting apparatus (namely, on-vehicle apparatus) 6.

The vehicle-sided traveling supporting apparatus 6 transmits traveling difference information (prediction deviation information) 103, which is obtained by the below-mentioned manner, to a road-sided traveling supporting apparatus (road-sided apparatus) 1 provided in a road-sided safety information providing apparatus 26, by way of a communication manner.

As will be explained later, the road-sided traveling supporting apparatus 1 predicts the traveling condition of the vehicle 21 based upon map information and vehicle traveling model information to obtain traveling condition prediction information. Then, the road-sided traveling supporting apparatus 1 executes the prediction of the subsequent traveling condition of the vehicle 21 based upon corrected traveling condition prediction information obtained by correcting the traveling condition prediction information with the traveling difference information from the on-vehicle apparatus 6.

A traveling-supporting-information producing apparatus 27 inputs the traveling condition prediction information of the road-sided apparatus 1 to produce supporting information corresponding to the traveling condition of the vehicle 21. The traveling-supporting-information producing apparatus 27 may provide with the driver of the vehicle 21 safety-related information such as the over-speed of the vehicle, forward traffic streams (traffic jam or the like) and traveling obstacles. The information of the traveling-supporting-information producing apparatus 27 is transferred by a road-sided traffic information displaying apparatus 28 and an on-vehicle information displaying apparatus 22.

In the case of the on-vehicle information displaying apparatus 22, the target vehicle 21 to which the information is provided is specified using the DSRC communication, the cellular communication or the like, and then the information is transferred to the target vehicle 21.

On the other hand, in the case that the road-sided traffic information displaying apparatus 28 notifies the information to the vehicle 21 which constitutes the information providing target, the present position of the vehicle 21 which constitutes the information providing target is required to be tracked in real time, and timing at which the information is displayed on the road-sided traffic information displaying apparatus 28 is required to be determined. To this end, a vehicle position detecting apparatus is provided on the side of the road in the prior art.

As the vehicle position detecting apparatus provided on the roadside, a video (picture) analysis by a camera is known and also an ultrasonic-wave sensing device is known. A video monitoring apparatus by a camera is capable of detecting as to where the vehicle is located over a relatively long distance. However, such a video monitoring apparatus owns such a problem. That is to say, the longer the distance separated from the camera is increased, the larger the imaging precision is rapidly decreased. As a result, the cost of facility investment is increased and further, a dead angle may be produced by a large-sized vehicle and the growth of roadside trees.

An ultrasonic-wave sensing device is capable of obtaining vehicle passing information at a certain fixed point in satisfactory precision. However, it cannot track as to where the respective vehicles are presently located in real time.

In the present invention, the information providing timing can be determined based upon the high precision information owned by the vehicle 21 which constitutes the information providing target. Furthermore, when an observer 3 explained later is employed, the present position of the vehicle may be predicted in higher precision, while considering the process delay time such as data transfer operation. As a result, the determination precision of the information providing timing can be improved. Also, the facility appliances provided on the roadside can be reduced.

Figure 1:
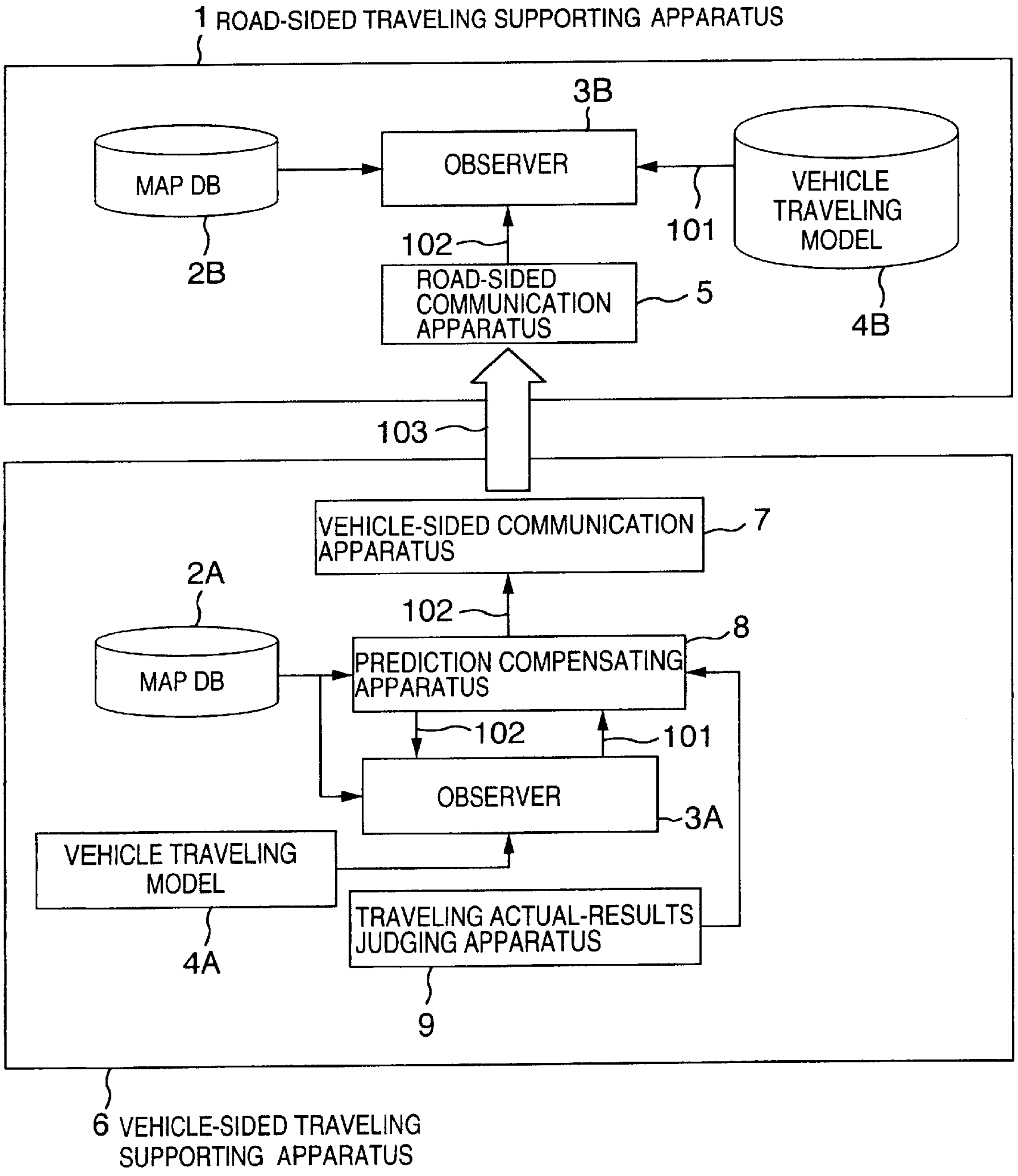
FIG. 1 is a schematic block diagram showing an arrangement of a major unit of a vehicle-traveling supporting system according to an embodiment of the present invention.

FIG. 1 schematically shows the detailed structures of the vehicle-sided traveling supporting apparatus 6 and the road-sided traveling supporting apparatus 1.

In FIG. 1, the vehicle-sided traveling supporting apparatus 6 includes a traveling actual-results judging apparatus 9 for inputting sensor information of various sensors provided in the vehicle 21 to output traveling actual-results information. An observer 3A predicts a present vehicle driving condition using traveling model information of a vehicle traveling model 4A and a map of a map database (will be referred to as a "map DB" hereinafter) 2A.

A prediction compensating apparatus 8 calculates a difference (traveling difference information or prediction deviation information) 102 between the traveling actual-results information of the traveling actual-results judging apparatus 9 and the traveling condition prediction information 101 predicted by the observer 3A. The prediction deviation information (traveling difference information) 102 outputted from the prediction compensating apparatus 8 is converted into prediction deviation information communication data 103 by a vehicle-sided communication apparatus 7 to be transmitted to a road-sided communication apparatus 5. The traveling difference information 102 outputted from the prediction compensating apparatus 8 is also supplied to the observer 3A.

The road-sided communication apparatus 5 provided on the road-sided traveling supporting apparatus 1 converts the prediction deviation information communication data 103 transmitted from the vehicle-sided communication apparatus 7 into the prediction deviation information 102 to supply the prediction deviation information 102 to the observer 3B. Since the observer 3B owns the same function as that of the observer 3A of the vehicle-sided traveling supporting apparatus 6, the observer 3B predicts the present vehicle traveling condition using the traveling model information of the vehicle traveling model 4B and the map information of the map DB 2B.

In this case, it should be understood that the observers 3A and 3B and the map databases 2A and 2B owned in the vehicle-sided traveling supporting apparatus 6 and the road-sided traveling supporting apparatus 1 have the same functions and the same information. The observer 3A predicts the vehicle traveling condition. The observer 3A predicts the vehicle traveling condition based upon the vehicle traveling model 4A and the map information of the map DB 2A which corresponds to previously-provided definite information, without using the vehicle sensor information inputted into the traveling actual-results judging apparatus 9.

The observer 3A predicts the actual-results of the vehicle traveling condition using also the traveling difference information 102 obtained in the prediction compensating apparatus 8 in order to execute the subsequent process operation.

This result of the vehicle traveling condition may be simply obtained by adding the traveling difference information 102 to the own predicted value. The prediction deviation information 102 may be obtained by the prediction compensating apparatus 8, as a difference value between the detection information (traveling actual-results information) obtained in the traveling actual-results judging apparatus 9 and the traveling condition prediction information of the observer 3A.

Figure 3:
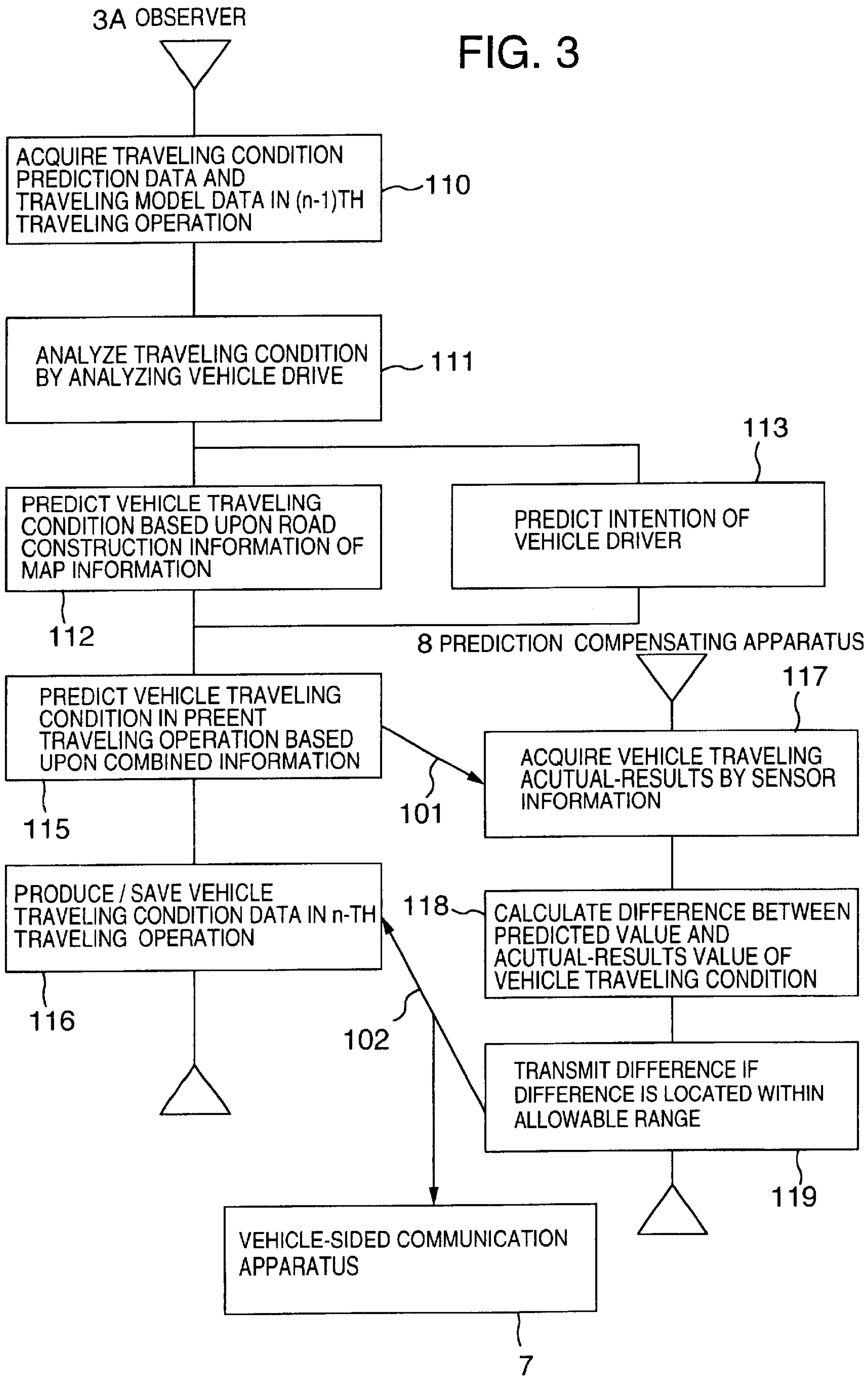
FIG. 3 is a flow chart for explaining the operation of the vehicle-traveling supporting system according to the embodiment of the present invention.

FIG. 3 is a flow chart for explaining the process flows executed by the observer 3A and the prediction compensating apparatus 8.

At a step 110, the observer 3A acquires the traveling condition prediction data in the preceding operation ((n−1)th operation) and the vehicle traveling model data of the vehicle traveling model 4A. While the traveling difference information 102 is added to the preceding traveling condition prediction data, this traveling condition prediction data is stored in a table provided within the observer 3A and so forth.

At a step 111, the observer 3A executes the analysis of the traveling condition by analyzing the vehicle's motion using the traveling condition prediction data in the preceding traveling operation ((n−1)th operation) and the vehicle traveling model data of the vehicle traveling model 4A. The process flow operation is advanced from the step 111 to steps 112 and 113. At the step 112, the observer 3A predicts the vehicle traveling condition based upon the road construction information of the map information saved in the map DB 2A. Also, the observer 3A predicts the intention of the driver of the vehicle 21 at the step 113.

At a step 115, the observer 3A predicts the vehicle traveling condition in the present traveling operation (n-th operation) based upon the information obtained by combining the prediction data acquired at the step 112 with the prediction data acquired at the step 113. Then, the observer 3A supplies the traveling condition prediction information 101 to the prediction compensating apparatus 8, and produces and saves the traveling condition data in the n-th operation at a step 116.

On the other hand, the prediction compensating apparatus 8 acquires the traveling actual-results information of the traveling actual-results judging apparatus 9 and the travel condition prediction information 101 at a step 117 to calculate the difference between the both information at a step 118. The traveling difference information 102 obtained at the step 118 is converted into the prediction deviation information communication data 103 by the vehicle-sided communication apparatus 7 to transmit the prediction deviation information communication data 103 to the road-sided communication apparatus 5. The traveling difference information 102 outputted from the prediction compensating apparatus 8 is also supplied to the observer 3A to be used in the process operation defined at the step 116.

Figure 4:
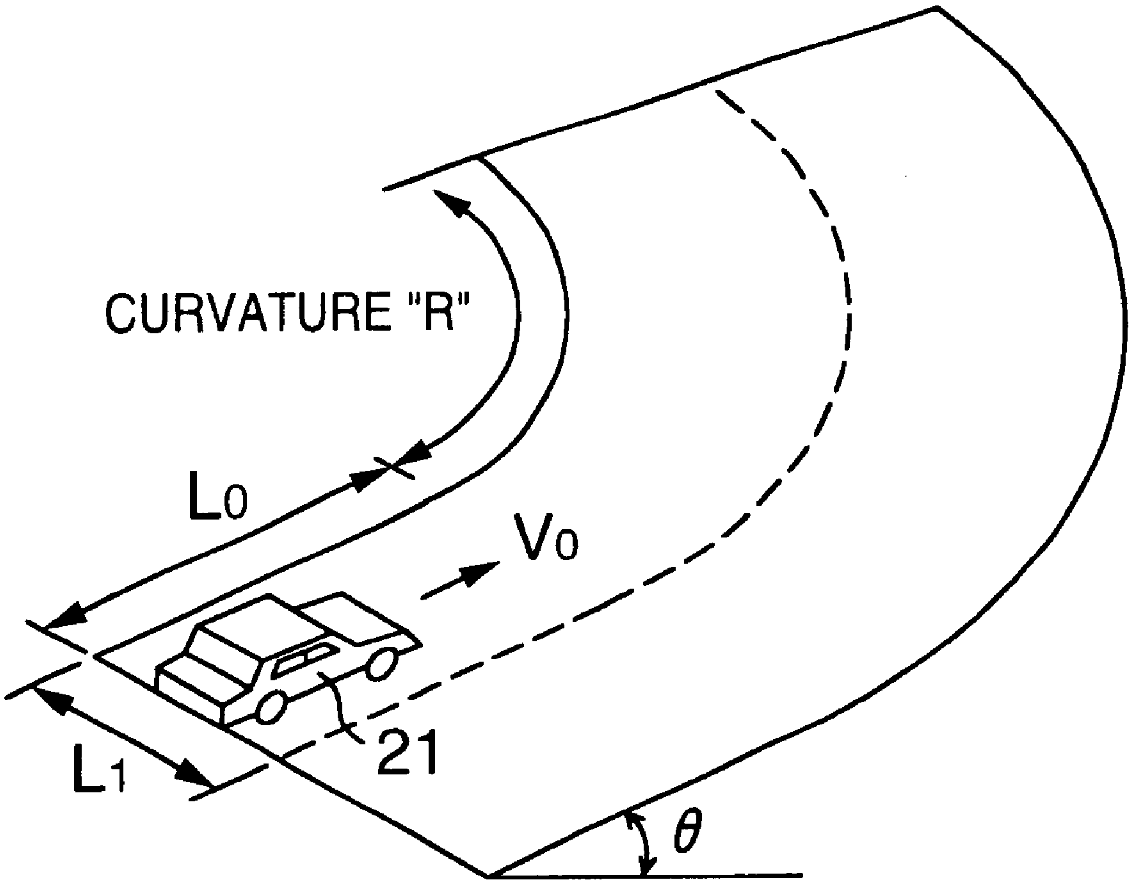
FIG. 4 is an explanatory diagram for explaining an example of the operation of the vehicle-traveling supporting system according to the embodiment of the present invention.

FIG. 4 is a schematic diagram obtained by combining the traveling vehicle 21 with the road structure (road construction) derived from the map information of the map DB 2A. In FIG. 4, it is assumed that the road inclination (gradient), the road lane width, and the continuous curvature of the road are registered as the map information. In FIG. 4, the road structure is represented with the road inclination θ° and the road being curved along the left direction from the position separated from the straight portion by the distance L0 at the curvature R1. Also, the lane width is equal to L1 (constant). The following assumption is made. That is, while the vehicle 21 enters into such a road structure, the speed of the vehicle 21 is V0 and the acceleration speed thereof is equal to α0 (=0), whereas the road structure just before the vehicle 21 enters into the above-described road structure is defined with the road inclination 0°, the straight road, and the lane width L1 (constant).

First, the traveling operation of the vehicle 21 may be predicted under such a road inclination. That is, since the vehicle 21 enters into the inclined road portion, if the driver of the vehicle 21 does not manipulate either the accelerator or the brake pedal and also drives on the uphill slope (θ>0), then the vehicle 21 is naturally decelerated. Also, if the vehicle driver does not manipulate either the accelerator or the brake pedal and also drives on the downhill slope (θ<0), then the vehicle 21 is naturally accelerated.

Within such a rage that the absolute value of the road inclination θ is small, after the vehicle 21 is driven in such a behavior manner, the vehicle speed V is changed higher than a certain speed. When the vehicle speed V exceeds a threshold speed value at which the vehicle driver can become aware of this high speed, the vehicle driver manipulates the accelerating/decelerating operation of the vehicle 21. As a result, the vehicle speed V may be again returned to the original vehicle speed. Such a behavior of the vehicle 21 can be predicted.

To the contrary, in the case that the absolute value of the road inclination θ is large, since the vehicle driver may recognize the road inclination before the vehicle 21 enters into the road inclination portion, the vehicle driver previously manipulates the accelerating/decelerating operation in accordance with the uphill/downhill slope of this road inclination portion. Therefore, it can be predicted that the speed change in the vehicle 21, which is caused by the road inclination, becomes small.

As a prediction of travel conditions in accordance with the curvature R, it is conceived from the relationship between the speed V of the entered vehicle and the curvature (which is recognized by the vehicle driver as such a fact that vehicle driver cannot see far ahead along this road, unless the road sign is installed) that the deceleration speed is rapidly emphasized if the curvature R is small and the speed V is high. Conversely, in the case that the vehicle is driven from the curved road portion into the straight road portion, it may be predicted that the vehicle driver manipulates the accelerating operation in order to return the decelerated speed by the curved road portion to the original vehicle speed.

As the behavior prediction along the transverse direction with respect to the lane width L1, the following drive behavior of the vehicle 21 is known. That is to say, under the stable condition, the vehicle driver normally drives the vehicle 21 along the center of the lane, or the road portion near the center line. If the lane width is constant and the road is the straight line, then it is so predicted that the vehicle driver keeps the drive position within the same lane as that for the previous drive condition. Also, when the vehicle 21 will enter into the curved road portion, it is so predicted that the vehicle driver drives the vehicle 21 on the outer side of the lane at the entrance of this curved road portion, and on the inner side of this lane within the curved road portion.

Since these predictions related to the above-explained road structures are combined with each other, it is possible to predict the position of the vehicle 21 and the behaviors of the accelerating/decelerating speeds. The precision of this drive prediction may be increased if the map information is made more precisely, for instance, the road information amount is further increased, e.g., there is an obstacle on the side of the road which may disturb that the vehicle driver can see far ahead along this road. However, this solution cannot always made the prediction precision more higher. This is because the intention of the vehicle driver cannot be easily predicted from the information produced from this function such as the road structures, while the vehicle 21 is controlled by the driving operation of the vehicle driver.

In the vehicle traveling supporting system of the present invention, the prediction achieved in the absolutely high precision is not always required. Instead, for example, while the dangerous condition is warned to the vehicle driver, this warning information is made by the road-sided displaying apparatus 28, and thus, such a vehicle driver who is warned can afford making of his final judgement. Therefore, a certain error may be allowed to some extent. As a result, a prediction error lower than, or equal to a certain allowable amount (namely, lower limit value of precision required to realize service of vehicle-traveling supporting system) need not be sequentially transmitted to the road-sided apparatus 1.

A similar prediction condition may be applied to the relative position with respect to the lane width L1. As a basic operation, the traveling vehicle 21 keeps the present relative position. However, in the curved road, there is such a trend that the vehicle which is driven along the right direction is approached to the center line. This operation may be processed as follows. That is, the judgement is made as to whether or not an error deviated from the prediction is located within a range where the vehicle is immediately driven over the present lane. When the error becomes a certain constant condition, this error may be newly transmitted to the road-sided apparatus 1. This may detect the vehicle safety condition with respect to the lane overrun, and also, the risk degree of the vehicles driven along the counter direction at the poor observation portion. Namely, such a risk degree is present when the vehicle driven along the counter direction across the center line and then enters into the opposite lane.

As previously explained, the difference is calculated between the prediction value (traveling condition prediction value) of the observer 3A and the actually measured value (traveling actual-results value) of the traveling actual-results judging apparatus 9, and the threshold value of the allowable error is preset, and is defined in accordance with the purpose of the vehicle-traveling supporting system. As a result, this difference value is no longer transmitted unless the travel condition prediction value is largely deviated, resulting in a high efficiency.

On the other hand, such a fact that the vehicle 21 has a different behavior from the predicted behavior may be predicted as such a fact that this vehicle 21 owns a safety problem behavior. In the case of the predicable behavior of the vehicle 21 under the stable condition, namely safety drive of this vehicle, a total amount of information transmitted from the vehicle 21 to the road-sided apparatus 1 may be reduced. Only when such a dangerous condition happens to occur which cannot be predicted, only a necessary amount of information may be transmitted, resulting in a high efficiency.

In this case, it is alternatively conceivable that the difference between the present error value and the preceding error value is transmitted in order to reduce the communication amount. Although the communication amount may be reduced under the stable drive condition, the sufficient communication between the vehicle 21 and the road-sided apparatus cannot be established when the drive condition is largely changed. For instance, in such a case that while the vehicle 21 enters into a curved road portion, the driver of this vehicle 21 delays to decelerate the vehicle speed or delays to steer the steering wheel due to his careless mistakes, if the above-explained difference between the present error value and the preceding error value is employed, then there is no error difference, so that no communication is carried out. However, in accordance with the prediction system of the present invention, since the decelerating operation of the vehicle 21 which should be originally and apparently carried out could not be performed, this error value may be detected as the error larger than, or equal to the allowable value with respect to the predicted error value, so that the communication may be carried out.

On the other hand, in the vehicle-traveling supporting system of the present invention, the map DB 2A and 2B utilized by the observers 3A and 3B are saved as the definite information in the on-vehicle apparatus 6 and the road-sided apparatus 1. As to the information amount of the map databases, since the storage media such as a CD and DVD having large storage capacities are nowadays popularized, there is no practical problem when such necessary information is additionally combined with the presently saved map data.

As the map information, not only the 2-dimensional road line shape structures, but also the 3-dimensional road structures, and other road information may be embedded, namely, lanes, lane widths, and more precise road information; various sorts of landmarks which are effectively used to define/correct positions which may constitute important aspects capable of supporting vehicle travels; and also positions of fixed-point information apparatuses which are previously installed, may be embedded.

Since the map information capacity is considerably increased, and also the sorts of information are varied and made more precise, the observers 3A and 3B can improve the prediction precision. This implies that the difference between the predicted traveling information and the traveling actual-results information may be decreased. As a result, the communication amount transmitted from the vehicle-sided traveling supporting apparatus 6 to the road-sided traveling supporting apparatus 7 can be reduced. Also, this implies that many sorts of information can be transmitted from the vehicle 21 to the road-sided apparatus 1 in high precision without increasing the communication capacity, because of the observer functions. That is, in this observer function, the very large amount of map information such as the map DBs 2A and 2B can be stored and can be utilized.

In this case, in accordance with the present invention, the map DB 2A must be made identical to the map DB 2B, and further, the observer 3A must be made identical to the observer 3B. However, the following difficulty may occur in the identical database arrangements. That is, there are many different modes as to the vehicle 21, since the setting time of the vehicle-traveling supporting system is different from the updating time of the map information. However, this difficulty may be solved by such a manner that when the vehicle on which new map information and a new observer are mounted is newly traveled, such a new map information is previously registered and also such a new observer is previously registered into the road-sided traveling supporting apparatus 1. Thus, a plurality of map DBs 2B and also a plurality of observer 3B are present in the road-sided traveling supporting apparatus 1.

Although not specifically explained in the supporting system of the embodiment shown in FIG. 1, in such a case that the vehicle 21 of the counter party is specified, the map DB 2B and the observer 3B provided in the road-sided traveling supporting apparatus 1 previously interrogate the sort of the map DB 2A and the sort of the observer 3A, which are mounted on this specified vehicle 21, and execute a process operation capable of selecting the same sorts of map database/observer.

It should also be noted that in accordance with the present invention, the traveling actual-results information saved in the road-sided apparatus 1 is made coincident with the traveling actual-results information saved in the on-vehicle apparatus 6 without transmitting all of the information. Alternatively, in the case that such precision adapted to utilizing of information is required, when the predicted deviation information 102 is obtained by the prediction compensating apparatus 8, all of the information may not be transmitted while the absolute value of this deviation is present within the allowable range in a similar manner that the deviation is not present.

Figure 5:
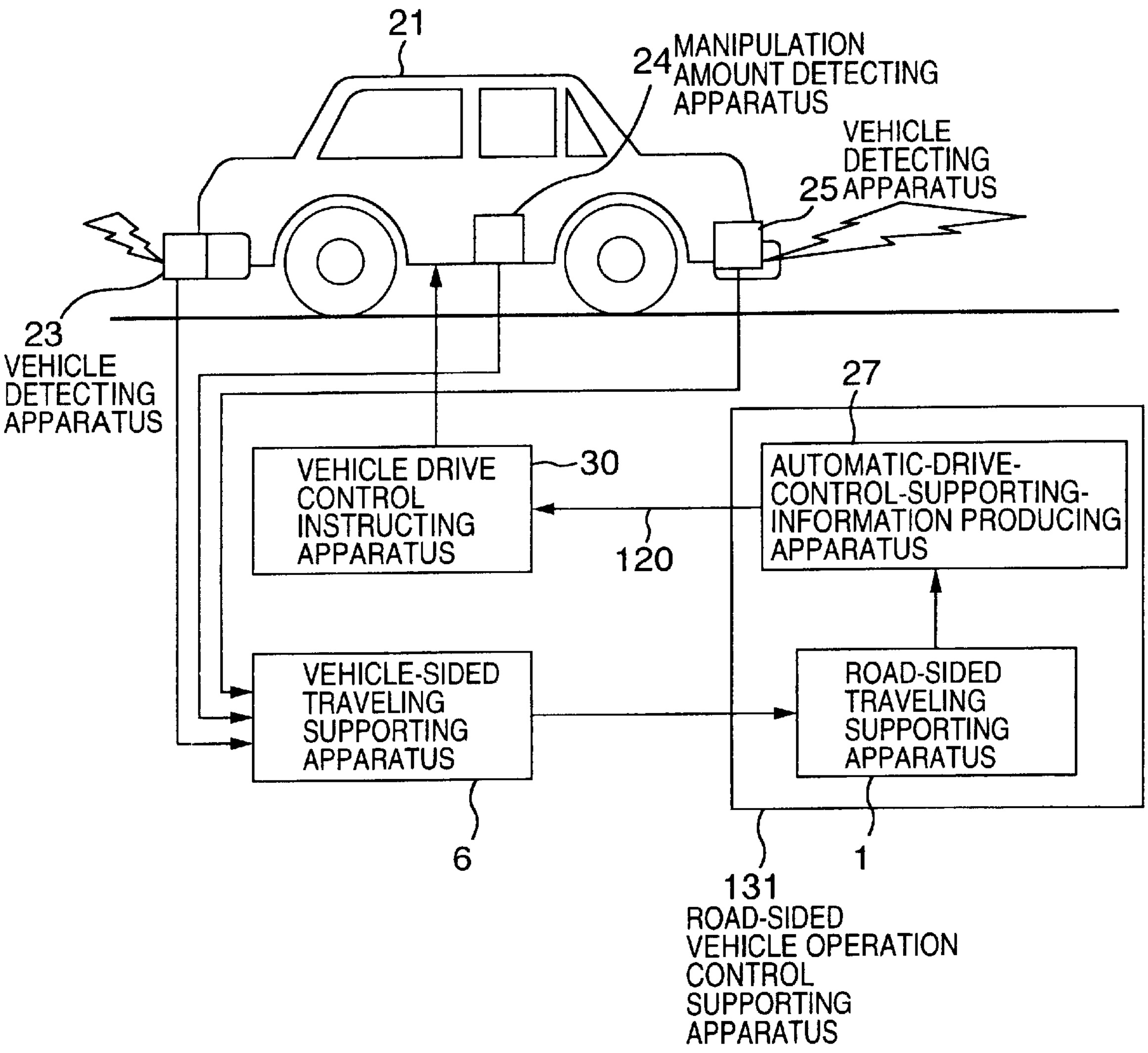
FIG. 5 is a schematic block diagram showing an arrangement of a vehicle-traveling supporting system according to another embodiment of the present invention.

FIG. 5 schematically indicates an arrangement of a vehicle-traveling supporting system according to another embodiment of the present invention.

In the supporting system of this embodiment shown in FIG. 5, vehicle drive control supporting information 120 produced in a road-sided vehicle drive control supporting apparatus 131 is transferred to a vehicle 21 so as to be used when an instruction value to an actuator is produced by a vehicle drive control instructing apparatus 30. In this embodiment, this supporting system may be realized by constituting an observer 3A and a prediction compensating apparatus 8, similar to those of the embodiment shown in FIG. 2. Alternatively, in order to make the information of the road-sided apparatus coincident with the information of the on-vehicle apparatus in more high precision, the observer function of the vehicle drive control instructing apparatus 30 provided on the vehicle side may be introduced into the road-sided vehicle drive control supporting apparatus 131. A result of such an observer is applied to the input of the observer 3B employed in the road-sided traveling supporting apparatus 1. Also, an instruction value outputted from the vehicle drive control instructing apparatus 30 is entered into the observer 3A of the vehicle-sided traveling supporting apparatus 6. In principle, the instruction value inputted into the road-sided apparatus is not completely made coincident with the instruction inputted into the vehicle-sided apparatus. However, there is at least the following merit. That is to say, while the occurrence of deviation caused by this drive control instruction can be suppressed, the information amount of the predicted deviation information 102 may be reduced.

As previously described in detail, in accordance with the vehicle-traveling supporting system of the present invention, only when there is such traveling difference information between the traveling actual-results information and the traveling condition prediction information of the vehicle, which is predicted, only this traveling difference information is transmitted from the on-vehicle apparatus to the road-sided apparatus. As a consequence, the information communication can be carried out only when the traveling difference information is present, and furthermore, only such traveling difference information may be communicated between the on-vehicle apparatus and the road-sided apparatus, so that a total amount of communication information can be reduced. As a result, the information communication between the on-vehicle apparatus and the road-side apparatus can be carried out in a higher efficiency.

What is claimed is:

1. A vehicle-traveling supporting system comprising:

a road-sided traveling supporting apparatus including a first observer; and a vehicle-sided traveling supporting apparatus provided in a vehicle, wherein said first observer of said road-sided traveling supporting apparatus predicts a traveling condition of said vehicle based upon first map information and first vehicle traveling model information to obtain first traveling condition prediction information, and generates traveling condition data by receiving traveling difference information, which is transmitted from said vehicle-sided traveling supporting apparatus, to correct said first traveling condition prediction information; and said vehicle-sided traveling supporting apparatus includes:

a second observer for predicting the traveling condition of said vehicle based upon second map information and second vehicle traveling model information to obtain second traveling condition prediction information;

a traveling actual-results judging unit for obtaining traveling actual-results information of said vehicle based upon sensor information; and a prediction compensating unit for obtaining said traveling difference information which indicates a difference between said second traveling condition prediction information obtained in said second observer and said traveling actual-results information obtained in said traveling actual-results judging unit, wherein the traveling condition of said vehicle in a next traveling operation is predicted based upon said traveling condition data.

2. The vehicle-traveling supporting system claimed in claim 1, further comprising a traveling supporting information generation apparatus for inputting said first traveling condition prediction information obtained in said road-sided traveling supporting apparatus, and for generating supporting information corresponding to the traveling condition of said vehicle to transmit said generated supporting information to a road-sided traffic information displaying apparatus or an on-vehicle information displaying apparatus.

3. A vehicle-traveling supporting system comprising:

a road-sided traveling supporting apparatus including a first observer; and a vehicle-sided traveling supporting apparatus provided in a vehicle, wherein said first observer of said road-sided traveling supporting apparatus predicts a traveling condition of said vehicle based upon map information and vehicle traveling model information to obtain first traveling condition prediction information, and generates traveling condition data by receiving traveling difference information, which is transmitted from said vehicle-sided traveling supporting apparatus, to correct said first traveling condition prediction information; and said vehicle-sided traveling supporting apparatus includes:

a second observer for predicting the traveling condition of said vehicle based upon the map information and the vehicle traveling model information to obtain second traveling condition prediction information, a traveling actual-results judging unit for obtaining traveling actual-results information of said vehicle based upon sensor information; and a prediction compensating unit for obtaining said traveling difference information which indicates a difference between said second traveling condition prediction information obtained in said second observer and said traveling actual-results information obtained in said traveling actual-results judging unit, wherein the traveling condition of said vehicle in a next traveling operation is predicted based upon said traveling condition data.

4. The vehicle-traveling supporting system claimed in claim 3, wherein said vehicle-sided traveling supporting apparatus transmits said traveling difference information to said road-sided traveling supporting apparatus when said difference exceeds to a predetermined threshold.

5. The vehicle-traveling supporting system claimed in claim 3, wherein vehicle drive control supporting information, which is produced in said road-sided vehicle traveling supporting apparatus and is transmitted to said vehicle-sided traveling supporting apparatus, is used to produce an actuator instruction value.

* * * * *